(12) United States Patent
Carlisle et al.

(10) Patent No.: US 7,042,575 B2
(45) Date of Patent: May 9, 2006

(54) SPECKLE SIZING AND SENSOR DIMENSIONS IN OPTICAL POSITIONING DEVICE

(75) Inventors: Clinton B. Carlisle, Palo Alto, CA (US); Jahja I. Trisnadi, Cupertino, CA (US); Charles B. Roxlo, Saratoga, CA (US); David A. Lehoty, Mt. View, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 0 days.

(21) Appl. No.: 11/128,988

(22) Filed: May 13, 2005

(65) Prior Publication Data

US 2005/0259267 A1 Nov. 24, 2005

Related U.S. Application Data

(60) Provisional application No. 60/573,062, filed on May 21, 2004, provisional application No. 60/573,075, filed on May 21, 2004.

(51) Int. Cl.
*G01B 9/02* (2006.01)
*G09G 5/08* (2006.01)

(52) U.S. Cl. ...................... 356/498; 345/166
(58) Field of Classification Search ............ 356/496, 356/498; 345/166
See application file for complete search history.

(56) References Cited

U.S. PATENT DOCUMENTS

| | | |
|---|---|---|
| 3,922,093 A | 11/1975 | Dandliker et al. |
| 4,546,347 A | 10/1985 | Kirsch |
| 4,799,055 A | 1/1989 | Nestler et al. |
| 5,288,993 A | 2/1994 | Bidiville et al. |
| 5,473,344 A | 12/1995 | Bacon et al. |
| 5,578,813 A | 11/1996 | Allen et al. |
| 5,644,139 A | 7/1997 | Allen et al. |
| D382,550 S | 8/1997 | Kaneko et al. |
| D385,542 S | 10/1997 | Kaneko et al. |
| 5,703,356 A | 12/1997 | Bidiville et al. |
| 5,729,008 A | 3/1998 | Blalock et al. |
| 5,729,009 A | 3/1998 | Dandliker et al. |
| 5,786,804 A | 7/1998 | Gordon |
| 5,825,044 A | 10/1998 | Allen et al. |

(Continued)

OTHER PUBLICATIONS

R. E. Kalman, "A New Approach to Linear Filtering and Prediction Problems", Transactions of the ASME-Journal of Basic Engineering, 82 (Series D); Copyright 1960, ASME, pp. 35-45, Research Institute for Advanced Study, Baltimore, MD.

*Primary Examiner*—Gregory J. Toatley, Jr.
*Assistant Examiner*—Patrick J. Connolly
(74) *Attorney, Agent, or Firm*—Okamoto & Benedicto LLP

(57) ABSTRACT

One embodiment relates to an optical displacement sensor for sensing transverse displacement of a data input device relative to a surface by determining displacement of optical features in a succession of frames. The sensor includes at least a coherent light source, illumination optics to illuminate a portion of the surface, imaging optics, and a first array of photosensitive elements having a periodic distance. The illuminator and the detector are configured to produce on the first array of photosensitive elements an intensity pattern of light reflected from the illuminated portion of the surface. The intensity pattern comprises a plurality of speckles having an average speckle diameter which is between one half and two times the periodic distance of the array.

20 Claims, 3 Drawing Sheets

U.S. PATENT DOCUMENTS

| | | |
|---|---|---|
| 5,854,482 A | 12/1998 | Bidiville et al. |
| 5,907,152 A | 5/1999 | Dandliker et al. |
| 5,963,197 A | 10/1999 | Bacon et al. |
| 5,994,710 A | 11/1999 | Knee et al. |
| 6,031,218 A | 2/2000 | Piot et al. |
| 6,037,643 A | 3/2000 | Knee |
| 6,057,540 A | 5/2000 | Gordon et al. |
| 6,097,371 A | 8/2000 | Siddiqui et al. |
| 6,151,015 A | 11/2000 | Badyal et al. |
| 6,172,354 B1 | 1/2001 | Adan et al. |
| 6,225,617 B1 | 5/2001 | Dandliker et al. |
| 6,233,368 B1 | 5/2001 | Badyal et al. |
| 6,281,881 B1 | 8/2001 | Siddiqui et al. |
| 6,281,882 B1 | 8/2001 | Gordon et al. |
| 6,326,950 B1 | 12/2001 | Liu |
| 6,330,057 B1 | 12/2001 | Lederer et al. |
| 6,351,257 B1 | 2/2002 | Liu |
| 6,396,479 B1 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| D464,352 S | 10/2002 | Kerestegian |
| 6,462,330 B1 | 10/2002 | Venkat et al. |
| 6,476,970 B1 | 11/2002 | Smith |
| 6,529,184 B1 | 3/2003 | Julienne |
| 6,585,158 B1 | 7/2003 | Norskog |
| 6,603,111 B1 | 8/2003 | Dietz et al. |
| 6,621,483 B1 | 9/2003 | Wallace et al. |
| 6,642,506 B1 * | 11/2003 | Nahum et al. ......... 250/231.13 |
| 6,657,184 B1 | 12/2003 | Anderson et al. |
| 6,664,948 B1 | 12/2003 | Crane et al. |
| 6,674,475 B1 | 1/2004 | Anderson |
| 6,677,929 B1 | 1/2004 | Gordon et al. |
| 6,703,599 B1 | 3/2004 | Casebolt et al. |
| 6,737,636 B1 | 5/2004 | Dietz et al. |
| 6,774,351 B1 | 8/2004 | Black |
| 6,774,915 B1 | 8/2004 | Rensberger |
| 6,795,056 B1 | 9/2004 | Norskog et al. |
| 6,809,723 B1 | 10/2004 | Davis |
| 6,819,314 B1 | 11/2004 | Black |
| 6,823,077 B1 | 11/2004 | Dietz et al. |
| 2002/0130835 A1 | 9/2002 | Brosnan |
| 2002/0158300 A1 | 10/2002 | Gee |
| 2002/0190953 A1 | 12/2002 | Gordon et al. |
| 2003/0034959 A1 | 2/2003 | Davis et al. |
| 2004/0084610 A1 | 5/2004 | Leong et al. |
| 2004/0189593 A1 | 9/2004 | Koay |
| 2005/0024336 A1 | 2/2005 | Xie et al. |
| 2005/0024623 A1 | 2/2005 | Xie et al. |
| 2005/0083303 A1 | 4/2005 | Schroeder et al. |

* cited by examiner

----- Original
—— Averaged across L

SPECKLE SIZING AND SENSOR DIMENSIONS IN OPTICAL POSITIONING DEVICE

CROSS-REFERENCE TO RELATED APPLICATIONS

The present application claims the benefit of U.S. provisional application No. 60/573,062, entitled "Speckle-based optical position sensing device having speckle size matched to a sensor dimension," filed May 21, 2004, by inventors Clinton B. Carlisle, Jahja I. Trisnadi, Charles B. Roxlo, and David A. LeHoty. The disclosure of the aforementioned U.S. provisional application is hereby incorporated by reference in its entirety.

The present application also claims the benefit of U.S. provisional application No. 60/573,075, entitled "Optical position sensing device having a detector array using different combinations of shared interlaced photosensitive elements," filed May 21, 2004, by inventors David A. LeHoty, Douglas A. Webb, Charles B. Roxlo, Clinton B. Carlisle, and Jahja I. Trisnadi. The disclosure of the aforementioned U.S. provisional application is hereby incorporated by reference in its entirety.

TECHNICAL FIELD

The present invention relates generally to an optical positioning device (OPD), and methods of sensing movement using same.

BACKGROUND OF THE INVENTION

Pointing devices, such as computer mice or trackballs, are utilized for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse. Alternatively, movement of the hand over a stationary device may be used for the same purpose.

Computer mice come in both optical and mechanical versions. Mechanical mice typically use a rotating ball to detect motion, and a pair of shaft encoders in contact with the ball to produce a digital signal used by the computer to move the cursor. One problem with mechanical mice is that they are prone to inaccuracy and malfunction after sustained use due to dirt accumulation and the like. In addition, the movement and resultant wear of the mechanical elements, particularly the shaft encoders, necessarily limit the useful life of the device.

One solution to the above-discussed with mechanical mice problems has been the development of optical mice. Optical mice have become very popular because they are more robust and may provide a better pointing accuracy.

The dominant conventional technology used for optical mice relies on a light emitting diode (LED) illuminating a surface at grazing incidence, a two-dimensional CMOS (complementary metal-oxide-semiconductor) detector which captures the resultant images, and software that correlates successive images to determine the direction, distance and speed the mouse has been moved. This technology typically provides good accuracy but suffers from low optical efficiency and relatively high image processing requirements.

Another approach uses one-dimensional arrays of photo-sensors or detectors, such as photodiodes. Successive images of the surface are captured by imaging optics, translated onto the photodiodes, and compared to detect movement of the mouse. The photodiodes may be directly wired in groups to facilitate motion detection. This reduces the photodiode requirements, and enables rapid analog processing. An example of one such a mouse is disclosed in U.S. Pat. No. 5,907,152 to Dandliker et al.

The mouse disclosed in Dandliker et al. differs from the standard technology also in that it uses a coherent light source, such as a laser. Light from a coherent source scattered off of a rough surface generates a random intensity distribution of light known as speckle. The use of a speckle-based pattern has several advantages, including efficient laser-based light generation and high contrast images even under illumination at normal incidence. This allows for a more efficient system and conserves current consumption, which is advantageous in wireless applications so as to extend battery life.

Although a significant improvement over the conventional LED-based optical mice, these speckle-based devices have not been wholly satisfactory for a number of reasons. In particular, mice using laser speckle have not demonstrated the accuracy typically demanded in state-of-the-art mice today, which generally are desired to have a path error of less than 0.5% or thereabout.

The present disclosure discusses and provides solutions to certain problems with prior optical mice and other similar optical pointing devices.

SUMMARY OF THE INVENTION

One embodiment relates to an optical displacement sensor for sensing transverse displacement of a data input device relative to a surface by determining displacement of optical features in a succession of frames. The sensor includes at least a coherent light source, illumination optics to illuminate a portion of the surface, imaging optics, and a first array of photosensitive elements having a periodic distance. The illuminator and the detector are configured to produce on the first array of photosensitive elements an intensity pattern of light reflected from the illuminated portion of the surface. The intensity pattern comprises a plurality of speckles having an average speckle diameter which is between one half and two times the periodic distance of the array.

Another embodiment relates to a method of sensing movement of a data input device across a surface. A portion of the surface is illuminated using an illuminator having a coherent light source, and light from the illuminated portion of the surface is reflected. The light is mapped onto an array of detector elements such that the light at the array comprises a speckle pattern with an average speckle diameter. The speckle pattern is detected by the array. The array comprises a periodicity which is between one half and two times the average speckle diameter.

Another embodiment relates to an optical positioning device including a laser light source illuminating an area of a surface with light of a wavelength, and a detector including a first array having a periodic distance in a first dimension. The optical positioning device further includes optics comprising a numerical aperture in the first dimension so as to map a speckle pattern with an average speckle diameter in the first dimension from the illuminated area to the detector. The numerical aperture in the first dimension is between one half and two times the wavelength divided by the periodic distance in the first dimension.

Other embodiments are also disclosed.

BRIEF DESCRIPTION OF THE DRAWINGS

These and various other features and advantages of the present invention be understood more fully from the detailed description that follows and from the accompanying drawings, which however, should not be taken to limit the appended claims to the specific embodiments shown, but are for explanation and understanding only, where:

DETAILED DESCRIPTION

Problems with Speckle Detection

Figure 1A:
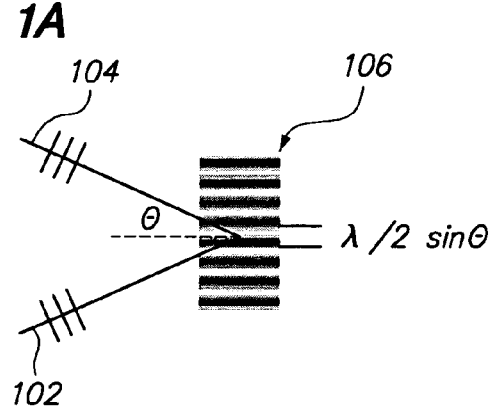
FIGS. 1A and 1B illustrate, respectively, a diffraction pattern of light reflected from a smooth surface and speckle in an interference pattern of light reflected from a rough surface.

One problem with prior speckle-based OPDs is that speckles in the imaging plane are sometimes too small to be properly detected. This reduces the sensitivity and accuracy of the OPD. A related problem is that increasing the speckle size too much may substantially reduce the resultant signal-to-noise ratio.

Another problem with prior speckle-based OPDs is that the image analysis of the speckle pattern is sensitive to statistical fluctuations in the speckle pattern. Because speckles are generated through phase randomization of scattered coherent light, actual observed speckle can exhibit local patterns which do not have the expected average speckle size. In other words, while the speckles have a defined size and distribution on average, local patterns may be inconsistent with the average.

As discussed in detail below, one aspect of the present invention discloses a solution to both the above-discussed problems of speckle detection and statistical fluctuations in the speckle pattern.

OPD Embodiments Disclosed Herein

The present disclosure relates generally to a sensor for an Optical Positioning Device (OPD), and to methods for sensing relative movement between the sensor and a surface based on displacement of a random intensity distribution pattern of light, known as speckle, reflected from the surface. OPDs include, but are not limited to, optical mice or trackballs for inputting data to a personal computer.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Generally, the sensor for an OPD includes an illuminator having a light source and illumination optics to illuminate a portion of the surface, a detector having a number of photosensitive elements and imaging optics, and signal processing or mixed-signal electronics for combining signals from each of the photosensitive elements to produce an output signal from the detector.

In one embodiment, the detector and mixed-signal electronics are fabricated using standard CMOS processes and equipment. Preferably, the sensor and method of the present invention provide an optically-efficient detection architecture by use of structured illumination that produces uniform phase-front and telecentric speckle-imaging as well as a simplified signal processing configuration using a combination of analog and digital electronics. This architecture reduces the amount of electrical power dedicated to signal processing and displacement-estimation in the sensor. It has been found that a sensor using the speckle-detection technique, and appropriately configured in accordance with the present invention can meet or exceed all performance criteria typically expected of OPDs, including maximum displacement speed, accuracy, and % path error rates.

Introduction to Speckle-Based Displacement Sensors

This section discusses operating principles of speckle-based displacement sensors as understood and believed by the applicants. While these operating principles are useful for purposes of understanding, it is not intended that embodiments of the present disclosure be unnecessarily limited by these principles.

Referring to FIG. 1A, laser light of a wavelength indicated is depicted as a first incident wave 102 and second incident wave 104 to a surface, each making an angle of incidence θ with respect to the surface normal. A diffraction pattern 106 results which has a periodicity of λ/2 sin θ.

Figure 1B:
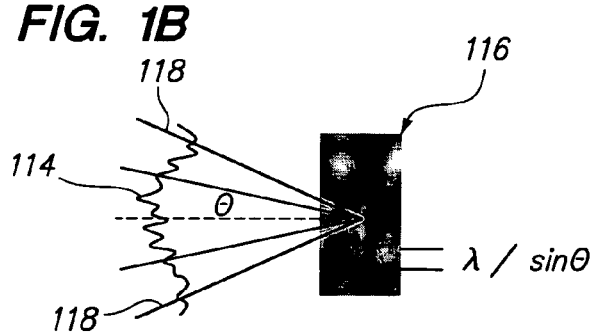

In contrast, referring to FIG. 1B, any general surface with morphological irregularities of dimensions greater than the wavelength of light (i.e. roughly>1 μm) will tend to scatter light 114 into a complete hemisphere in approximately a Lambertian fashion. If a coherent light source, such as a laser is used, the spatially coherent, scattered light will create a complex interference pattern 116 upon detection by a square-law detector with finite aperture. This complex interference pattern 116 of light and dark areas is termed speckle. The exact nature and contrast of the speckle pattern 116 depends on the surface roughness, the wavelength of light and its degree of spatial-coherence, and the light-gathering or imaging optics. Although often highly complex, a speckle pattern 116 is distinctly characteristic of a section of any rough surface that is imaged by the optics and, as such, may be utilized to identify a location on the surface as it is displaced transversely to the laser and optics-detector assembly.

Speckle is expected to come in all sizes up to the spatial frequency set by the effective aperture of the optics, conventionally defined in term of its numerical aperture NA=sin θ as shown FIG. 1B. Following Goodman [J. W. Goodman, "Statistical Properties of Laser Speckle Patterns" in "Laser Speckle and Related Phenomena" edited by J. C. Dainty, Topics in Applied Physics volume 9, Springer-Verlag (1984)—in particular, see pages 39–40], the size statistical distribution is expressed in terms of the speckle intensity auto-correlation. The "average" speckle diameter may be defined as $$a = \frac{\lambda}{\sin\theta} = \frac{\lambda}{NA} \qquad \text{(Equation 1)}$$

where λ is the wavelength of the coherent light.

It is interesting to note that the spatial frequency spectral density of the speckle intensity, which by Wiener-Khintchine theorem, is simply the Fourier transform of the intensity auto-correlation. The finest possible speckle, $a_{min}=\lambda/2NA$, is set by the unlikely case where the main contribution comes from the extreme rays 118 of FIG. 1B (i.e. rays at ±θ), and contributions from most "interior" rays interfere destructively. The cut-off spatial frequency is therefore $f_{co}=1/(\lambda/2NA)$ or $2NA/\lambda$.

Note that the numerical aperture may be different for spatial frequencies in the image along one dimension (say "x") than along the orthogonal dimension ("y"). This may be caused, for instance, by an optical aperture which is longer in one dimension than another (for example, an ellipse instead of a circle), or by anamorphic lenses. In these cases, the speckle pattern 116 will also be anisotropic, and the average speckle size will be different in the two dimensions.

One advantage of a laser speckle-based displacement sensor is that it can operate with illumination light that arrives at near-normal incidence angles. Sensors that employ imaging optics and incoherent light arriving at grazing incident angles to a rough surface also can be employed for transverse displacement sensing. However, since the grazing incidence angle of the illumination is used to create appropriately large bright-dark shadows of the surface terrain in the image, the system is inherently optically inefficient, as a significant fraction of the light is reflected off in a specular manner away from the detector and thus contributes nothing to the image formed. In contrast, a speckle-based displacement sensor can make efficient use of a larger fraction of the illumination light from the laser source, thereby allowing the development of an optically efficient displacement sensor.

DISCLOSED DESIGN FOR SPECKLE-BASED DISPLACEMENT SENSOR

The detailed description below describes an architecture for one such laser-speckle-based displacement sensor using CMOS photodiodes with analog signal combining circuitry, moderate amounts of digital signal processing circuitry, and a low-power light source, such as, for example, a 850 nm Vertical Cavity Surface Emitting Laser (VCSEL). While certain implementational details are discussed in the detailed description below, it will be appreciated by those skilled in the art that different light sources, detector or photosensitive elements, and/or different circuitry for combining signals may be utilized without departing from the spirit and scope of the present invention.

A speckle-based mouse according to an embodiment of the present invention will now be described with reference to FIGS. 2 and 3.

Figure 2:
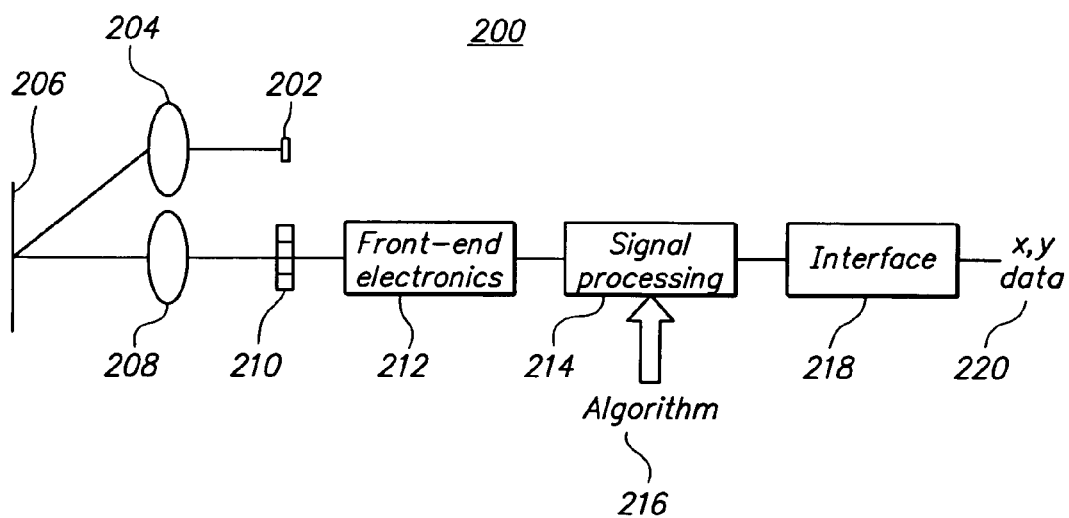
FIG. 2 is a functional block diagram of a speckle-based mouse according to an embodiment of the present invention.

FIG. 2 is a functional diagram of a speckle-based system 200 according to an embodiment of the invention. The system 200 includes a laser source 202, illumination optics 204, imaging optics 208, at least two sets of multiple CMOS photodiode arrays 210, front-end electronics 212, signal processing circuitry 214, and interface circuitry 216. The photodiode arrays 210 may be configured to provide displacement measurements along two orthogonal axes, x and y. Groups of the photodiodes in each array may be combined using passive electronic components in the front-end electronics 212 to produce group signals. The group signals may be subsequently algebraically combined by the signal processing circuitry 214 to produce an (x, y) signal providing information on the magnitude and direction of displacement of the OPD in x and y directions. The (x,y) signal may be converted by the interface circuitry 218 to x,y data 220 which may be output by the OPD. Sensors using this detection technique may have arrays of interlaced groups of linear photodiodes known as "differential comb arrays."

Figure 3:
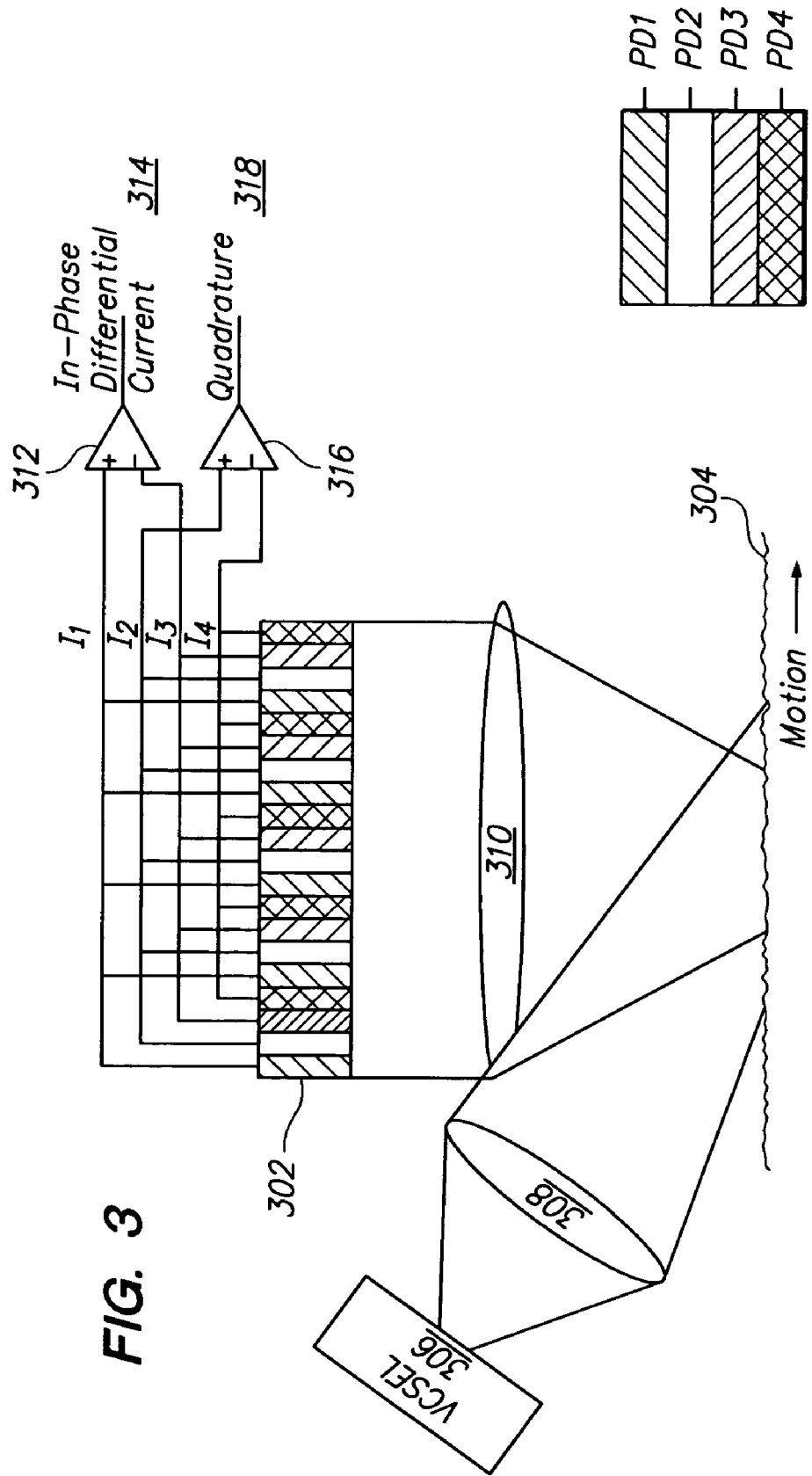
FIG. 3 is a block diagram of a photodiode array according to an embodiment of the present invention.

FIG. 3 shows a general configuration (along one axis) of such a photodiode array 302, wherein the surface 304 is illuminated by a coherent light source, such as a Vertical Cavity Surface Emitting Laser (VCSEL) 306 and illumination optics 308, and wherein the combination of interlaced groups in the array 302 serves as a periodic filter on spatial frequencies of light-dark signals produced by the speckle images.

Speckle generated by the rough surface 304 is mapped to the detector plane with imaging optics 310. Preferably, the imaging optics 310 are telecentric for optimum performance.

In one embodiment, the comb array detection is performed in two independent, orthogonal arrays to obtain estimations of displacements in x and y. A small version of one such array 302 is depicted in FIG. 3.

Each array in the detector consists of a number, N, of photodiode sets, each set having a number, M, of photodiodes (PD) arranged to form an MN linear array. In the embodiment shown in FIG. 3, each set consists of four photodiodes (4 PD) referred to as 1, 2, 3, 4. The PD1s from every set are electrically connected (wired sum) to form a group, likewise PD2s, PD3s, and PD4s, giving four signal lines coming out from the array. Their corresponding currents or signals are $I_1$, $I_2$, $I_3$, and $I_4$. These signals ($I_1$, $I_2$, $I_3$, and $I_4$) may be called group signals. Background suppression (and signal accentuation) is accomplished by using differential analog circuitry 312 to generate an in-phase differential current signal 314 ($I_{13})=I_1-I_3$ and differential analog circuitry 316 to generate a quadrature differential current signal 318 ($I_{24})=I_2-I_4$. These in-phase and quadrature signals may be called line signals. Comparing the phase of $I_{13}$ and $I_{24}$ permits detection of the direction of motion.

Preferably, to suppress the introduction of phase errors, which can translate directly into displacement error, the sensor of the present invention uses multiple comb arrays. Moreover, although the embodiments described herein use "4N" scheme for the individual arrays, the system design rationale is applicable (with appropriate modifications) for other array configurations or schemes, such as 3N, 5N, 6N, 7N, 8N, and so on. The terminology "4N" refers to a detector array in which every fourth detector is wired together, and the resulting four photocurrent signals are subtracted from each other as described in Dandliker, et al. (U.S. Pat. No. 5,907,152). However, many other groupings are possible with appropriate schemes for combining the signals.

Matching Speckle Size in Relation to Detector Pitch

As discussed above, problems with prior speckle-based OPDs include the difficulty of detecting smaller speckles and the reduction in signal when detecting larger speckles. The present application presents an effective solution to these problems by configuring the optics such that the average speckle diameter a is at or near a specified factor larger than the width w of elements in a detector. Alternatively, the detector may be configured such that the width w of the detector elements is at or near a specified fraction of the average speckle diameter a.

Consider a linear comb array with MN detector elements, where N is the number of sets in the array, each set having M elements such that the pitch of the array is Mw. In that case, in accordance with a preferred embodiment of the invention, the optics may be configured to produce an average speckle diameter $a=\lambda/NA$ which is given or approximately given according to the following equation.

$$a=Mw \quad \text{(Equation 2)}$$

More generally, the optics may be configured to produce an average speckle diameter which is between one half and two times the element width multiplied by M. From an alternative perspective, the detector element may be preferably configured with a width w which is given or approximately given according to the following equation.

$$w=a/M \quad \text{(Equation 3)}$$

More generally, the detector element may be configured with an element width which is between one half times and two times the average speckle diameter divided by M.

In the specific detector embodiment shown in FIG. 3 using a "4N" scheme (i.e. where M=4), the optics may be configured such that the average speckle diameter a may be preferably matched to the detector element width w according to the following equation.

$$a=Mw=4w \quad \text{(Equation 4)}$$

This size match is optimal or near optimal for the following reasons. If the speckle is significantly larger, the average speckle will more than cover an entire period of the array. In this case the current produced in the various signal wires is only weakly dependent on the position of the speckle, because several photodiodes are illuminated at once from the same speckle. On the other hand, if the speckle is much smaller than the detector element width w, then many speckles are present in each detector element. This causes a significant background photocurrent, which is also independent of the speckle position, and reduces the performance of the OPD. Hence, in accordance with an embodiment of the invention, the average speckle diameter is between one half times and two times the detector element width for such a "4N" configuration.

It is known in the literature on speckle that a range of spatial frequencies are present in the speckle image, and a comb detector of this type can be viewed as extracting a particular spatial frequency (corresponding to the detector pitch) from that range. Applicants believe that the strength of the motion signal is maximized, and unwanted background minimized, when the speckle size is matched or approximately matched to the detector array in accordance with Equation 2.

Note that in the case where the numerical aperture is different in different directions, the average speckle diameter is different as well and the matching condition is different for x and y. For an array oriented with a long axis parallel to the x-axis, the average speckle diameter in the x-direction needs to be matched to the pitch measured in the x-direction.

It should also be noted that the detector pitch is determined by the average spacing of the detectors along the axis. In some embodiments, the detectors will be regularly spaced with a fixed pitch (periodicity), but perfect periodicity is not required for the detector schemes described here. If the detector is not regularly spaced with a fixed pitch, but rather has an average pitch p, then Equation 2 may be modified to Equation 5 below.

$$a=p \quad \text{(Equation 5)}$$

Hence, in accordance with a preferred embodiment of the invention, the average speckle diameter is approximately one half of the pitch of the detector. More generally, the average speckle diameter is between one fourth and one times the pitch of the detector in accordance with an embodiment of the invention.

Length of Detector Elements

Figure 4:
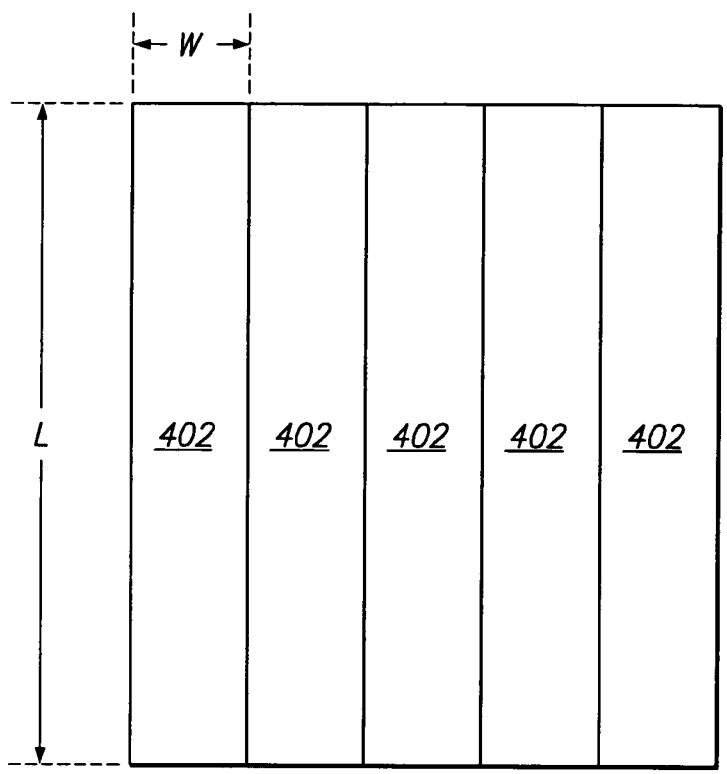
FIG. 4 is a diagram depicting an array of detector elements and the width and length dimensions of the elements therein.

FIG. 4 is a diagram depicting an array of detector elements and the width w and length L dimensions of the elements therein. While the above discussion focuses on the the width dimension of the elements, this section focuses on the length dimension.

In accordance with an embodiment of the invention, for robust operation of a linear detector array, the length L of a detector element is preferably at least several speckle diameters long, so that variation perpendicular to the intended direction of sensing movement will not generate erratic signals. This speckle averaging may contribute to a decrease in the modulation depth by a factor of $(a/L)^{1/2}$. For example, averaging across four to five speckles by using a detector element length L about four times the average speckle diameter a reduces the modulation depth by about a factor of about two.

Figure 5:
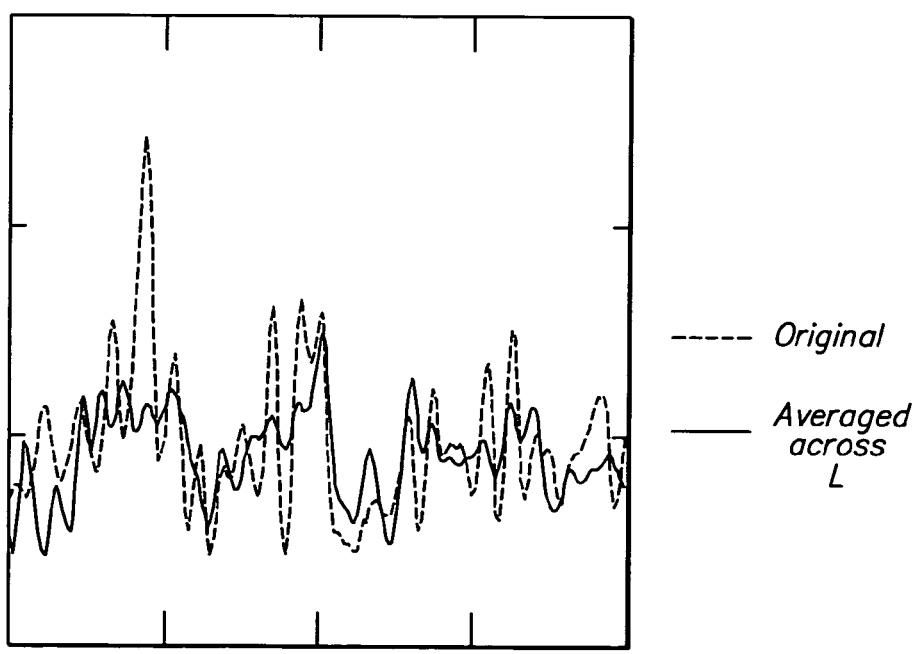
FIG. 5 presents a graph showing modulation depth without averaging and with averaging over element length L for a sensor configured according to an embodiment of the present invention.

A graphic example showing modulation depth (speckle contrast) without averaging (original) and with averaging over the element length L is provided in FIG. 5. Referring to FIG. 5, an additional decrease in the modulation depth by a factor $\sqrt{2}$ comes from surface depolarization. The modulation depth $\gamma$ after speckle averaging across the detector element length and depolarization is $$\gamma = \sqrt{\frac{a}{2L}} = \sqrt{\frac{w}{L}} \quad \text{(Equation 8)}$$

In accordance with an embodiment of the invention, the detector comprises a substantially uniform element length, and the element length is configured to be greater than the average speckle diameter so as to maintain a relatively stable signal with motion substantially parallel to the length (orthogonal to the width) of the element. The longer the element length, the greater the stability.

However, per FIG. 5, the longer the length, the greater the reduction in modulation depth. Hence, with that tradeoff, the element length may be configured to be between twice and ten times the average speckle diameter in accordance with another embodiment of the invention.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. An optical displacement sensor for sensing transverse displacement of a data input device relative to a surface by determining displacement of optical features in a succession of frames, the sensor comprising:
    an illuminator having a coherent light source and illumination optics to illuminate a portion of the surface; and
    a detector having imaging optics and at least a first array of photosensitive elements having a periodic distance, wherein the illuminator and the detector are configured to produce on the first array of photosensitive elements an intensity pattern of light reflected from the illuminated portion of the surface, wherein the intensity pattern comprises a plurality of speckles having an average speckle diameter which is between one half and two times the periodic distance of the array.

2. The optical displacement sensor according to claim 1, wherein the average speckle diameter provided is approximately one periodic distance of the array.

3. The optical displacement sensor according to claim 1, wherein the first array of photosensitive elements comprises a differential comb array including M groups of interlaced elements.

4. The optical displacement sensor according to claim 3, wherein each of the photosensitive elements comprise a substantially uniform element width, and wherein the illuminator and the detector are configured to provide an average speckle diameter between one half times the element width multiplied by M and two times the element width multiplied by M.

5. The optical displacement sensor according to claim 4, wherein the average speckle diameter provided is approximately one element width multiplied by M.

6. The optical displacement sensor according to claim 1, wherein the wavelength of light from the coherent light source and a numerical aperture (NA) of the imaging optics are selected to provide the average speckle diameter.

7. The optical displacement sensor according to claim 1, wherein each of the photosensitive elements comprise a substantially uniform element length greater than the average speckle diameter.

8. The optical displacement sensor according to claim 7, wherein the element length is between twice and ten times the average speckle diameter.

9. The optical displacement sensor according to claim 1, further comprising a second array of photosensitive elements, the second array having the photosensitive elements arranged along a second axis not parallel to a first axis along which the photosensitive elements of the first array are arranged.

10. The optical displacement sensor according to claim 9, wherein the average speckle diameter provided is different along the second axis than that along the first axis by configuring the optics with a numerical aperture along the second axis which is different than the numerical aperture along the first axis.

11. A method of sensing movement of a data input device across a surface, the method comprising:

illuminating a portion of the surface using an illuminator having a coherent light source;

reflecting light from the illuminated portion of the surface;

mapping the light onto an array of detector elements such that the light at the array comprises a speckle pattern with an average speckle diameter;

detecting the speckle pattern by the array, wherein the array comprises a periodicity which is between one half times and two times the average speckle diameter.

12. The method of claim 11, wherein the periodicity is approximately equal to the average speckle diameter.

13. The method of claim 11, wherein each element in the array comprises a substantially uniform element width.

14. The method of claim 13, wherein the array comprises a differential comb array including M groups of interlaced elements, and wherein the mapping results in the average speckle diameter at the array being between one half and two times the element width multiplied by M.

15. The method of claim 13, wherein the mapping results in the average speckle diameter at the array being approximately equal to the element width multiplied by M.

16. The method of claim 13, wherein each element in the array further comprises a substantially uniform element length which is greater than the average speckle diameter.

17. The method of claim 16, wherein the element length is at least twice the average speckle diameter.

18. An optical positioning device comprising:

a laser light source illuminating an area of a surface with light of a wavelength;

a detector including a first array having a periodic distance in a first dimension; and optics comprising a numerical aperture in the first dimension so as to map a speckle pattern with an average speckle diameter in the first dimension from the illuminated area to the detector, wherein the numerical aperture in the first dimension is between one half times and two times the wavelength divided by the periodic distance in the first dimension.

19. The optical positioning device of claim 18, wherein the numerical aperture is approximately equal to the wavelength divided by the periodic distance.

20. The optical positioning device of claim 18, wherein the detector further includes a second array having a periodic distance in a second dimension, wherein the optics further comprises a different numerical aperture in the second dimension so as to map the speckle pattern with a different average speckle diameter in the second dimension from the illuminated area to the detector, and wherein the numerical aperture in the second dimension is between one half times and two times the wavelength divided by the periodic distance in the second dimension.

* * * * *